US010683803B2

(12) United States Patent
Berti et al.

(10) Patent No.: US 10,683,803 B2
(45) Date of Patent: Jun. 16, 2020

(54) COMPRESSED-AIR ENERGY-STORAGE SYSTEM

(71) Applicant: Nuovo Pignone Srl, Florence (IT)

(72) Inventors: Matteo Berti, Pontedera (IT); Michele D'Ercole, Florence (IT); Stefano Francini, Florence (IT); Allesandro Russo, Florence (IT); Paola Del Turco, Impruneta (IT)

(73) Assignee: NUOVO PIGNONE SRL, Florence (IT)

( * ) Notice: Subject to any disclaimer, the term of this patent is extended or adjusted under 35 U.S.C. 154(b) by 78 days.

(21) Appl. No.: 14/391,493

(22) PCT Filed: Apr. 8, 2013

(86) PCT No.: PCT/EP2013/057286
§ 371 (c)(1),
(2) Date: Oct. 9, 2014

(87) PCT Pub. No.: WO2013/153019
PCT Pub. Date: Oct. 17, 2013

(65) Prior Publication Data
US 2015/0075173 A1    Mar. 19, 2015

(30) Foreign Application Priority Data

Apr. 12, 2012   (IT) .............................. FI2012A0075

(51) Int. Cl.
*F02C 6/16*     (2006.01)
*F02C 1/04*     (2006.01)
(Continued)

(52) U.S. Cl.
CPC .................. *F02C 6/16* (2013.01); *F02C 1/04* (2013.01); *F02C 3/13* (2013.01); *F02C 7/08* (2013.01); *F05D 2220/76* (2013.01); *Y02E 60/15* (2013.01)

(58) Field of Classification Search
CPC ..................................... F02C 6/14; F02C 6/16
See application file for complete search history.

(56) References Cited

U.S. PATENT DOCUMENTS 3,677,008 A * 7/1972 Koutz ...................... F02C 6/16
                                                        290/52
3,866,058 A * 2/1975 Lenssen ................... F02C 6/16
                                                        290/52
(Continued)

FOREIGN PATENT DOCUMENTS

CN        102292533 A    12/2011
CN        102308065 A     1/2012
(Continued)

OTHER PUBLICATIONS

Unofficial English translation of Office Action issued in connection with corresponding CN Application No. 201380019401.5 dated Oct. 9, 2015.
(Continued)

*Primary Examiner* — Scott J Walthour
(74) *Attorney, Agent, or Firm* — Baker Hughes Patent Organization

(57) ABSTRACT

A compressed-air energy-storage system, comprising: a variable-nozzle expander configured to receive an airflow at a first pressure and partially expand said airflow at a second pressure, said second pressure being lower than said first pressure, expansion of said airflow in said variable-nozzle expander producing useful mechanical power; a heat generator component configured to receive a fuel and a partially expanded airflow from the variable-nozzle expander; and a
(Continued)

turbine configured to receive combustion gas from the heat generator component and expand the combustion gas producing useful mechanical power.

13 Claims, 3 Drawing Sheets

(51) Int. Cl.
*F02C 3/13* (2006.01)
*F02C 7/08* (2006.01)

(56) References Cited

U.S. PATENT DOCUMENTS

| | | | |
|---|---|---|---|
| 4,150,547 A * | 4/1979 | Hobson | F02C 6/16 165/45 |
| 4,237,692 A | 12/1980 | Ahrens | |
| 4,765,142 A | 8/1988 | Nakhamkin | |
| 4,885,912 A | 12/1989 | Nakhamkin | |
| 4,942,736 A * | 7/1990 | Bronicki | F02C 6/16 60/641.12 |
| 5,778,675 A | 7/1998 | Nakhamkin | |
| 6,276,123 B1 | 8/2001 | Chen | |
| 7,325,401 B1 | 2/2008 | Kesseli | |
| 7,640,643 B2 | 1/2010 | Nakhamkin | |
| 7,669,423 B2 | 3/2010 | Nakhamkin | |
| 8,011,189 B2 * | 9/2011 | Nakhamkin | F02C 6/16 60/39.183 |
| 2010/0083660 A1 * | 4/2010 | Nakhamkin | F02C 6/16 60/652 |
| 2011/0094231 A1 * | 4/2011 | Freund | F02C 6/16 60/727 |
| 2011/0094236 A1 | 4/2011 | Finkenrath et al. | |
| 2011/0113781 A1 | 5/2011 | Frey et al. | |

FOREIGN PATENT DOCUMENTS

| | | |
|---|---|---|
| JP | 58-176407 A | 10/1983 |
| JP | H02-045622 A | 2/1990 |
| JP | 2002-339760 A | 11/2002 |
| JP | 2003-301798 A | 10/2003 |
| WO | 199601942 A1 | 1/1996 |

OTHER PUBLICATIONS

Italian Search Report issued in connection with corresponding IT application FI2012A000075 dated Dec. 20, 2012.

International Search Report and Written Opinion issued in connection with corresponding PCT application PCT/EP2013/057286 dated Jun. 7, 2013.

Notification of Reasons for Refusal issued in connection with corresponding JP Application No. 2015-504917 dated Sep. 25, 2018 (English Translation not Available).

\* cited by examiner

STATE OF THE ART

COMPRESSED-AIR ENERGY-STORAGE SYSTEM

FIELD OF THE INVENTION

The present disclosure relates to compressed-air energy-storage systems, also shortly called CAES systems. The disclosure also refers to methods of energy storage and electric energy production using CAES systems.

DESCRIPTION OF THE RELATED ART

CAES power plants or systems are commonly used as a means for optimizing the exploitation of energy. As known to those skilled in the art, the electric energy required from the electric distribution grid varies with peaks during the day and reduced power requests at night time. Large steam power plants or renewable power plants produce an amount of power which cannot be varied at will. This causes an excess of power available on the electric distribution grid at night time and a power shortage during peak hours. Small power plants using gas turbines, especially aeroderivative gas turbines, have been implemented in order to cover the peak power requests. These plants can be turned on and shut down according to the variable power requirement during the 24 hours. This notwithstanding, further measures must be met, in order to store the energy in excess produced at night time and recover the stored energy to increase the electric power production during peak hours. One of the means used for that purpose is the CAES technology. These systems typically include a compression train having one or more compressors, which are driven by electric power from the grid during night time, i.e. when less power is required than available on the grid. The compressed air is then exploited during the day to cover peak power requests from the grid, expanding the compressed air to a suitable pressure and burning an air/fuel mixture in a combustion chamber to generate combustion gases, which are expanded in a turbine for power generation.

A compressed-air energy-storage system according to the prior art is shown in FIG. 1. The system comprises a compressed-air storage volume 1. The storage volume can be a natural or man-made cavern. Other suitable volumes can be used for storing compressed air. In the context of the present description reference will be made specifically to a "cavern", but those skilled in the art will appreciate that any other suitable storage volume can be used. When electric power in excess is available on the electric distribution grid G, a reversible electric machine 3 converts the electric power available from the electric distribution grid G into mechanical power to drive a compressor or compressor train 5 through a mechanical shaft 7. A clutch 9 is provided for selectively connecting the compressor or compressor train 5 to the reversible electric machine 3, and disconnecting the compressor or compressor train 5 therefrom. Compressed air from the compressor or compressor train 5 is delivered by a compressed air line 11 through a valve 13 in the cavern 1.

When more electric power is required from the electric distribution grid G, a power generating section 15 of the CAES system is activated. The power generating section 15 comprises one or more expanders. In the embodiment shown in FIG. 1 a first, high-pressure expander 17 is arranged in line with a second, low-pressure expander 19. The two expanders 17 and 19 are usually connected to one and the same mechanical shaft 21. The mechanical shaft 21 is connectable to or disconnectable from the reversible electric machine through a clutch 23. Compressed air from the cavern 1 is fed via a high pressure pipe 25 to the high-pressure expander 17.

The compressed air from the cavern 1 is expanded in the high-pressure expander 17. The expanded air is delivered to a combustion chamber 29. Fuel F is added to the flow of partially expanded air to generate combustion gas which is expanded in the second, low-pressure expander 19. Exhausted combustion gases are then discharged from the low pressure expander 19 at 31. The pressure in the combustion chamber 29 must be carefully controller in order for the combustion chamber to operate correctly. It is therefore essential that the pressure of the air coming from the cavern 1 be precisely controlled before expanding the air in the high-pressure expander 17, such that the partly expanded air enters the combustion chamber 29 at the correct pressure.

The pressure in the cavern 1 varies depending upon the amount of air compressed and stored in the cavern 1. The air pressure in the high pressure pipe 25 must be maintained at a substantially constant value. For this purpose, a pressure regulating valve 27 is provided along the high pressure pipe 25, to reduce the pressure of the air coming from the cavern 1 to a value suitable for achieving the correct combustion pressure at the exit of the high pressure expander 17. The expansion of the air in the pressure regulating valve 27 causes a reduction of the energy contained in the pressurized air, but is essential in order for the air to achieve a suitable pressure value when entering the combustion chamber 29 downstream of the high-pressure expander 17. The pressure regulating valve 27 maintains the pressure of the air at the inlet of the high-pressure expander at a substantially constant value, which is independent of the variable air pressure in the cavern 1.

The expansion of the air in the pressure regulating valve 27 causes a remarkable loss of energy, which negatively affects the overall efficiency of the CAES system.

SUMMARY OF THE INVENTION

An optimized overall efficiency of a CAES system or power plant is achieved by providing an expander with a variable geometry of the inlet nozzles, also named "variable-nozzle expander" in the context of the present disclosure. Compressed air from a storage volume, e.g. a cavern, is delivered to the variable-nozzle expander and partly expanded from a higher pressure to a lower pressure. "Partly expanded" means that the air at the delivery side of the variable-nozzle expander will still be pressurized, i.e. will have a pressure higher than ambient pressure.

Mechanical power is generated by the variable-nozzle expander during this first expansion of the compressed airflow. The inlet-nozzle geometry of the variable-nozzle expander can be modified during operation, such that the final airflow pressure at the outlet of the variable-nozzle expander is maintained at a substantially constant value, or at least maintained within a range of tolerance around a nominal pressure. Such value or value range is set by the operating conditions within a combustion chamber of a turbine, wherein the partly expanded airflow is mixed with a fuel and the air/fuel mixture is ignited to generate a combustion gas flow, which is then further expanded in a turbine for power generation. In the present disclosure, a combustion chamber is understood as being any heat generator component. The variable-nozzle geometry maintains the expander outlet pressure at the desired value or around the desired value even in case of fluctuations of the inlet airflow pressure. Pressure reduction and regulation is thus achieved with a machinery capable of extracting mechanical power.

According to exemplary embodiments of the disclosure, a compressed-air energy-storage system is provided, comprising: at least one high-pressure expansion system comprising a variable-nozzle expander configured to receive an airflow at a first pressure and expand said airflow at a second pressure, said second pressure being lower than said first pressure, expansion of said airflow in said variable-nozzle expander producing useful mechanical power; at least one combustion chamber, i.e. a heat generator component, configured to receive a fuel and an expanded airflow from said variable-nozzle expander; and at least one turbine configured to receive combustion gas from said combustion chamber, i.e. heat generator component, and expand said combustion gas producing useful mechanical power.

According to some embodiments the variable-nozzle expander is controlled to maintain the second pressure within a pressure range around a constant pressure value, i.e. a nominal or rated value. The nominal value can e.g. be determined by the design of the combustion chamber or heat generator component.

For example, the second pressure, i.e. the pressure at the outlet of the variable-nozzle expander, can fluctuate by, in an embodiment, less than 20% and, in an embodiment, less than 10% around a nominal value. In some embodiments, the pressure fluctuation is within 6%, e.g. approximately 4% around the nominal value.

According to some embodiments the system comprises at least one electric machine, configured and arranged to transform the useful mechanical power produced by the turbine and/or by the variable-nozzle expander in electric power. The electric power can be used in turn to power one or more machines and/or can be distributed on an electric energy distribution grid.

In some embodiments, the mechanical power is used to drive a reversible electric machine configured for selectively transforming mechanical power in electric power or for transforming electric power from an electric distribution grid into mechanical power. In some embodiments, the system further comprises at least one air compressor. The electric machine is configured and arranged for selectively producing electric power exploiting the mechanical power generated by the variable-nozzle expander and by the turbine, or for driving into rotation said at least one air compressor when transforming electric power from said electric distribution grid into mechanical power. The system can further comprise at least one compressed-air storage volume, connected to said at least one air compressor by at least one compressed-air line path, for storing energy in form of compressed air.

In some embodiments the variable-nozzle expander and the turbine have a common shaft. The electric machine can be selectively connected to said common shaft or to said at least one air compressor.

In other embodiments, the variable-nozzle expander and the turbine have two independent output shafts. In such case the system can further comprise: a first electric machine configured and arranged to transform the useful mechanical power produced by the variable-nozzle expander in electric power; and a second electric machine configured and arranged to transform the useful mechanical power produced by said turbine in electric power. Either one or both said electric machines can be reversible electric machines arranged and configured to selectively transform useful mechanical power into electric power, or produce mechanical power when powered by an electric distribution grid.

In some embodiments the system can comprise a first air compressor selectively connectable to or disconnectable from the first electric machine and a second air compressor selectively connectable to or disconnectable from the second electric machine. The first and second air compressors are connected by compressed-air lines to at least one compressed-air storage volume, e.g. a cavern.

The compression of air causes temperature increase. The heat generated in the air flow during compression can be recovered in order to increase the overall efficiency of the system. Therefore, according to some improved embodiments, the system further comprises one or more thermal-energy storage devices. The thermal-energy storage device(s) are, in an embodiment, configured to store heat extracted from the flow of compressed air delivered by one or more compressors. When, conversely, compressed air flows from the compressed-air storage volume towards the variable-nozzle expander, heat can be transferred from the thermal-energy storage device(s) to the air flow, to increase the energy content of the air, which can subsequently be exploited in the variable-nozzle expander and/or in the turbine. If several thermal-energy storage devices are provided, they can be arranged so as to remove heat from the compressed air flow at different pressure levels. In some embodiments, the thermal-energy storage device can be arranged to cool the air between two serially arranged compression stages. The effect of the thermal-energy storage device in this case will be similar to an intercooling, increasing the overall efficiency of the compressor arrangement. As a matter of fact, the thermal-energy storage device comprises a heat exchanger, wherein the air flow exchanges heat with a cooling medium. The cooling medium can behave as a heat storage medium. The cooled air has a higher density and further compression requires less power.

The heat can be recovered when delivering the compressed air towards the variable-nozzle expander and/or towards the turbine. Heat can be transferred back to the flow of compressed air upstream of the variable-nozzle expander, or between the variable-nozzle expander and the turbine, or both.

In some embodiments, heat can be recovered also from the combustion gases at the turbine discharge. This can be obtained by means of a heat exchanger, wherein the compressed air is heated by heat exchange with the exhausted combustion gases discharged from the turbine. Recovery of heat from the combustion gases can be used in combination with heat recovery from the thermal-energy storage device, or without such thermal-energy storage device being used.

While heat recovered through heat exchange with the flow of compressed air is used to heat the air before expansion thereof in the turbine and/or in the variable-nozzle expander in an embodiment, the recovered heat could be used also in a different way, e.g. for heating or air-conditioning purposes.

According to a further aspect, the disclosure relates to a method for producing energy from a compressed-air energy-storage system, comprising the step of: producing useful mechanical power by partially expanding a compressed airflow from a first pressure to a second pressure in a variable-nozzle expander; said first pressure being higher than said second pressure; delivering said partially expanded airflow at said second pressure to a heat generator component and mixing fuel thereto, producing a high temperature, pressurized combustion gas; producing useful mechanical power by expanding said combustion gas in a turbine.

According to some embodiments, the method comprises the step of controlling the second pressure of the airflow by means of the variable-nozzle expander, maintaining the second pressure within a range of pressure values and, in an embodiment, at a substantially constant value. "Substantially constant" means a pressure which varies, in an embodiment, less than 20% and, in an embodiment, less than 10% and, in an embodiment, less than 6% around a pre-set value.

According to some embodiments, the method comprises the step of converting the useful mechanical power generated by the variable-nozzle expander and/or by said turbine in electric power by means of at least one reversible electric machine.

For example, the method can comprise the steps of: compressing air in a compressed-air storage volume by means of at least one air compressor driven by at least one reversible electric machine during an air-compressing phase; and using compressed air from said compressed-air storage volume to generate said compressed airflow during a power-generation phase. In an embodiment, the method further comprises the step of recovering and storing heat from air compressed by said at least one air compressor during said air-compressing phase. Additionally, the method can also comprise heating said compressed airflow during said power-generation phase by means of heat stored during the air-compressing phase. The stored heat can be used as an independent source of energy, e.g. for ambient conditioning. In other embodiments, the method comprises recovering heat from the gas expanded in said turbine for heating said airflow.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
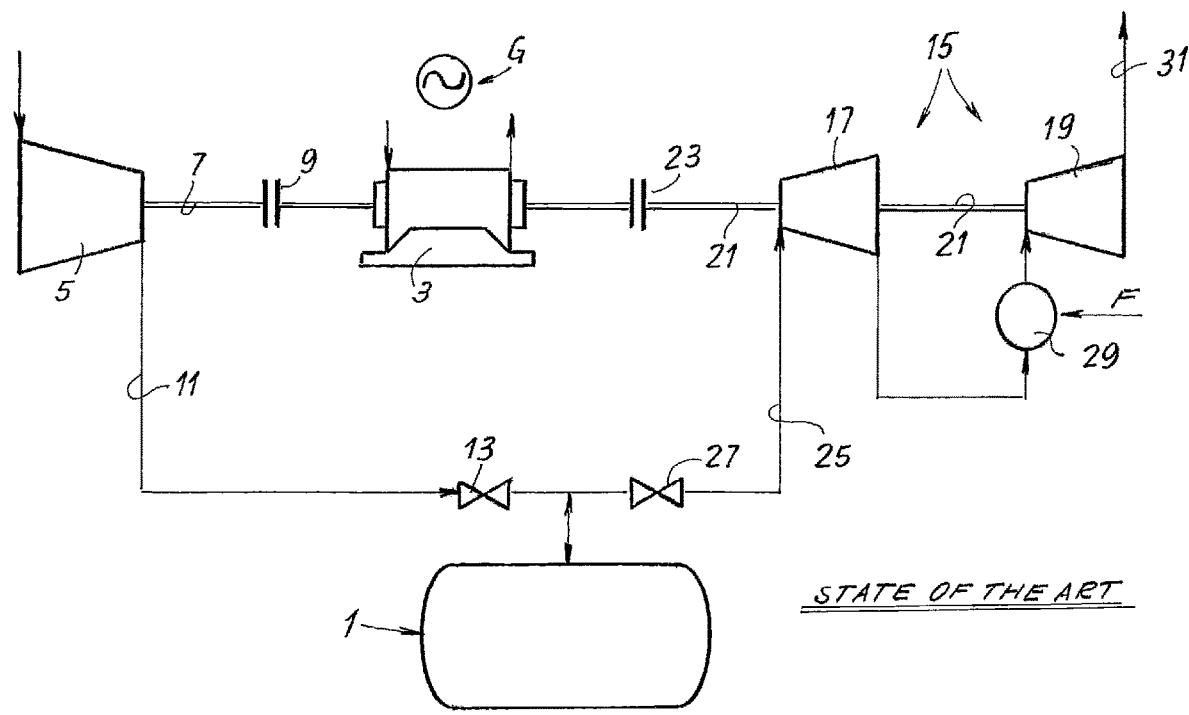
FIG. 1 illustrates a CAES power plant according to the state of the art.
Figure 2:
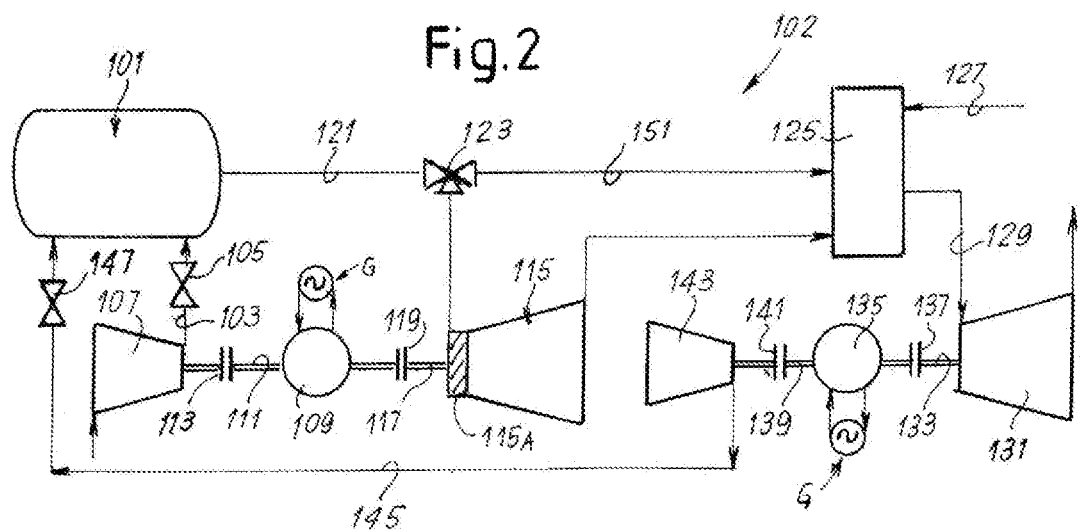
FIG. 2 through 6 illustrates five embodiments of a CAES power plant or system according to the present disclosure.

A first embodiment of a CAES power plant according to the present disclosure is shown in FIG. 2. The power plant or system, designated 102 as a whole, comprises a compressed-air storage volume 101, wherein compressed air is stored when an excess electric power is available on an electric power distribution grid schematically shown at G. Here below the compressed-air storage volume 101 will be referred to also as a "cavern".

Compressed air is fed into the cavern 101 through a compressed-air line path 103 along which a valve 105 can be provided. Compressed air is delivered by a compressor train 107. A compressor train can include a single compressor or several compressor in series or in parallel depending upon the flow rate and the compression ratio. Here below the term ∂compressor train"should therefore be understood as including either a set of compressors in series or in parallel or a single compressor.

The compressor train 107 is driven by a reversible electric machine 109. A "reversible electric machine" should be understood as any arrangement, which is capable of producing selectively mechanical power from electric power and electric power from available mechanical power.

The reversible electric machine 109 can be connected to the compressor train 107 and disconnected therefrom by means of a shaft 111 and a clutch 113.

The reversible electric machine 109 is also selectively connectable to an expander 115 and disconnectable therefrom. Connection between the reversible electric machine 109 and the expander 115 is obtained through a shaft 117 and a clutch 119. Clutches 119 and 113 are controlled such as to selectively connect the reversible electric machine 109 either to the compressor or compressor train 107, or the expander 115.

The expander 115 is a variable-nozzle expander, i.e. an expander including inlet nozzles, the geometry of which can be varied according to the pressure of the air at the inlet of the expander, to optimize the efficiency of the expander. A high-pressure inlet line 121 connects the cavern 101 to the nozzles, schematically shown at 115A, of the variable-nozzle expander 115.

In some embodiments a three-way valve 123 can be provided to connect the high-pressure inlet line 121 and the variable-nozzle expander 115, the three-way valve 123 being able to partly or entirely divert the airflow from the cavern 101 towards a heat generator component, herein indicated as combustion chamber 125, as will be described later on.

The variable-nozzle expander 115 is in fluid communication with the combustion chamber 125 which is also connected to a fuel delivery. In some exemplary embodiments the fuel delivery includes a gas grid 127 for delivering a gaseous fuel. The combustion of the air/gas mixture in the combustion chamber 125 generates combustion gas which is delivered through a connection 129 to a turbine 131.

The turbine 131 is mechanically connected through a shaft 133 to a second reversible electric machine 135. A clutch 137 on the shaft 133 can selectively connect the reversible electric machine 135 to the turbine 131 and disconnect it therefrom. A further shaft 139 with a clutch 141 selectively connects the reversible electric machine 135 to a second compressor or compressor train 143 and disconnects it therefrom. As already noted with respect to the compressor train 107, also the compressor train 143 can include a single compressor or a plurality of compressors arranged in series or in parallel.

A second compressed-air line path 145 connects the outlet of the compressor train 143 to the cavern 101. A valve 147 can be provided along the compressed-air line path 145.

The CAES power plant 102 described so far operates as follows. During an electric-power generation phase, compressed air from the cavern 101 is delivered through the high-pressure inlet line 121 to the variable-nozzle expander 115. The airflow from the cavern 101 expands partly through the variable-nozzle expander 115, such that the pressure of the airflow drops from a first, higher pressure to a second, lower pressure. The geometry of the variable-nozzle expander 115 is controlled such that the second, lower pressure at the output of the variable-nozzle expander 115 is maintained within a narrow range and, in an embodiment, around a preset pressure value. This pressure value is determined by design constraints of the combustion chamber 125. The geometry of the variable-nozzle expander 115 can be changed to cope with the variation of the inlet pressure, i.e. the pressure of the airflow arriving from the cavern 101.

As noted above, the pressure in the cavern 101 can vary substantially during the electric-power generation phase, since the amount of air in the cavern 101 gradually reduces and the pressure therein drops. Typically the air pressure in a cavern of a CAES power plant can vary from 120 bar to 30 bar. These values are to be understood as exemplary values and do not limit the scope of the present disclosure.

The variable-nozzle expander 115 provides for the two functions of regulating the pressure at the inlet of the combustion chamber 125 and transforming the pressure of the airflow into useful mechanical power when reducing the air pressure from the first, higher pressure at the variable-nozzle expander inlet to the second, lower pressure at the variable-nozzle expander outlet.

Expansion of the airflow from the first, higher pressure to the second, lower pressure generates mechanical power, which is available on the output shaft 117 of the variable-nozzle expander 115. During the electric-power generation phase the clutch 119 connects the variable-nozzle expander 115 to the first reversible electric machine 109, such that the latter converts the useful mechanical power received from shaft 117 into useful electric power, which is delivered to the electric distribution grid G.

The partly expanded airflow delivered at the output of the variable-nozzle expander 115 is fed to the combustion chamber 125 and added with gaseous fuel, or other fuel, to produce high-temperature, compressed combustion gas, which is delivered to the turbine 131 through the connection 129. In the turbine 131 the combustion gas is expanded and the energy contained therein is transformed into useful mechanical energy. The useful mechanical power available on shaft 133 is converted into electric power by the second reversible electric machine 135, the latter being connected to the turbine 131 via clutch 137 and shaft 133. Additional electric power is therefore injected in the electric distribution grid G.

During the electric-power generation phase the clutches 113 and 141 are disengaged, such that the compressors or compressor trains 107 and 143 are inoperative.

The compressed air stored in the cavern 101 is therefore used to produce electric power during the peak hours, when more power is required from the electric distribution grid G.

When excessive electric power is available on the electric distribution grid G, the operation of the CAES power plant is reversed as follows.

Clutches 137 and 119 are disengaged and clutches 113 and 141 are engaged, such that the first reversible electric machine 109 and the second reversible electric machine 135 can drive into rotation the first compressor or compressor train 107 and the second compressor or compressor train 143, respectively. The compressor trains compress atmospheric air into the compressed-air storage volume, i.e. in the cavern 101 until a threshold pressure is achieved, or until power is available from the electric distribution grid G.

In this manner surplus power available on the electric distribution grid G is not wasted, but stored in form of potential energy of compressed air in the cavern 101 and used, when needed, by sequential expansion in the variable-nozzle expander 115 and turbine 131.

The use of a variable-nozzle expander 115 allows an increase in the overall efficiency of the power plant, i.e. increases the amount of peak-off energy stored in the cavern 101, which can be converted into electric energy during the electric-power production phase.

Indeed, as noted above, large pressure fluctuations in the high-pressure inlet line 121 are caused by the gradual pressure drop in the cavern 101 during the electric-power generation phase. In the CAES power plants according to the state of the art at least a fraction of the energy stored in the form of pressurized air is wasted in an expansion process through a pressure control valve, in order to generate a constant-pressure airflow to be delivered to the combustion chamber of the turbine. The higher the pressure in the cavern, the larger the amount of power wasted through expansion for pressure regulation and pressure control.

Conversely, in the power plant of FIG. 2 substantially the entire energy available in the compressed airflow from the cavern 101 can be exploited for power-production purposes, without waste because the function of the pressure control is performed by the variable-nozzle expander 115. This machine is capable of expanding the airflow from a higher inlet pressure to a lower, substantially constant, outlet pressure, converting the pressure drop in useful mechanical power.

The three-way valve 123, if present, can be used to bypass the variable-nozzle expander 115 and deliver the compressed air from the cavern 101 through an auxiliary line 151 directly to the combustion chamber 125.

Figure 3:
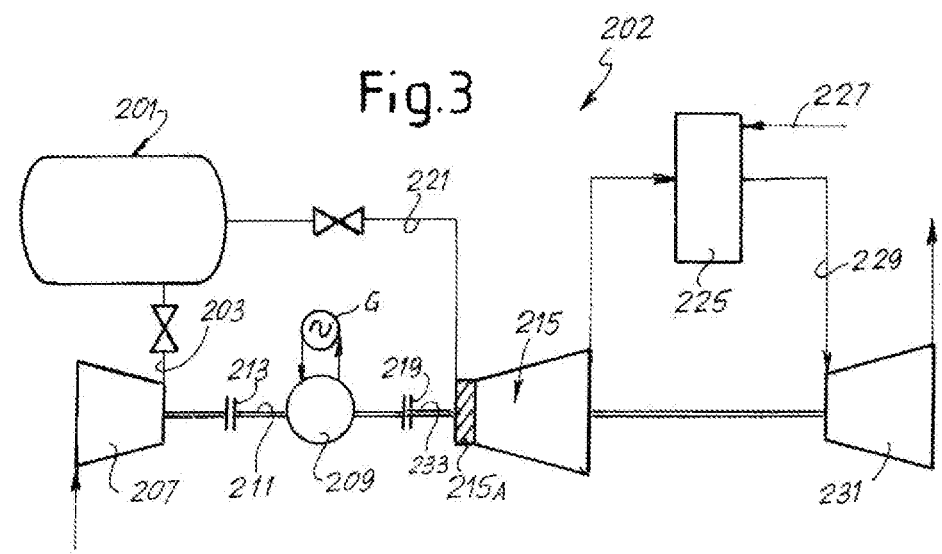

FIG. 3 shows a further embodiment of a CAES power plant or system according to the present disclosure. Differently from the CAES power plant of FIG. 2, in the CAES power plant of FIG. 3 only one reversible electric machine is provided. The variable-nozzle expander and the turbine are connected on the same shaft, which can be selectively connected to and disconnected from the reversible electric machine.

More specifically, the CAES power plant of FIG. 3, labeled 202 as a whole, uses a compressed-air storage volume 201, for example a cavern. The cavern 201 is in fluid communication with a variable-nozzle expander 215. Reference number 215A schematically indicates the variable-geometry inlet nozzles. The variable-nozzle expander 215 is in fluid communication with a combustion chamber 225, to which fuel is delivered, e.g. via a gas distribution grid 227. The outlet of the combustion chamber 225 is connected in 229 to a turbine 231.

A single mechanical shaft 233 and a clutch 219 selectively connect the rotor of the turbine 231 and the rotor of the variable-nozzle expander 215 to the reversible electric machine 209 and disconnect them therefrom.

Similarly to the reversible electric machine 109 and to the reversible electric machine 135 of FIG. 2, the reversible electric machine 209 can selectively operate as an electric motor or as an electric generator.

Through a shaft 211 and a clutch 213, the reversible electric machine 209 is selectively connectable to a compressor or compressor train 207, which is in turn in fluid communication with the cavern 201 through a compressed-air line 203.

The operation of the CAES power plant 202 of FIG. 3 is as follows.

During the electric-power generation phase, compressed air is delivered from the cavern 201 through the compressed-air line 221 to the variable-nozzle expander 215. The airflow delivered to the variable-nozzle expander 215 is expanded from the inlet variable pressure to a lower, outlet pressure, which is maintained substantially constant or within a rather narrow pressure range. A suitable range of variation of the outlet pressure is around 4% of a rated value. This value is given by way of example, but should not be construed as limiting the scope of the present disclosure. Useful mechanical power is generated by the first expansion of the airflow and is available on the mechanical shaft 233. The partly expanded airflow is mixed with a gaseous fuel, or other fuel, in the combustion chamber 225 and the air/fuel mixture is ignited to generate a flow of high-temperature, compressed, combustion gas, which is expanded in the turbine 231. The expansion of the combustion gas in turbine 231 generates useful mechanical power available on shaft 233.

The mechanical power generated in the described double, sequential expansion of the airflow and combustion gas is used to drive the reversible electric machine 209. The latter converts the mechanical power into electric power, which is injected in the electric distribution grid G.

During the air-compressing phase, when a surplus electric power is available on the electric distribution grid G, the reversible electric machine 209 is disconnected from mechanical shaft 233 by disengaging the clutch 219 and is selectively connected by a clutch 213 and shaft 211 to the compressor or compressor train 207. Electric power from the electric distribution grid G is used to compress air in the cavern 201.

Figure 4:
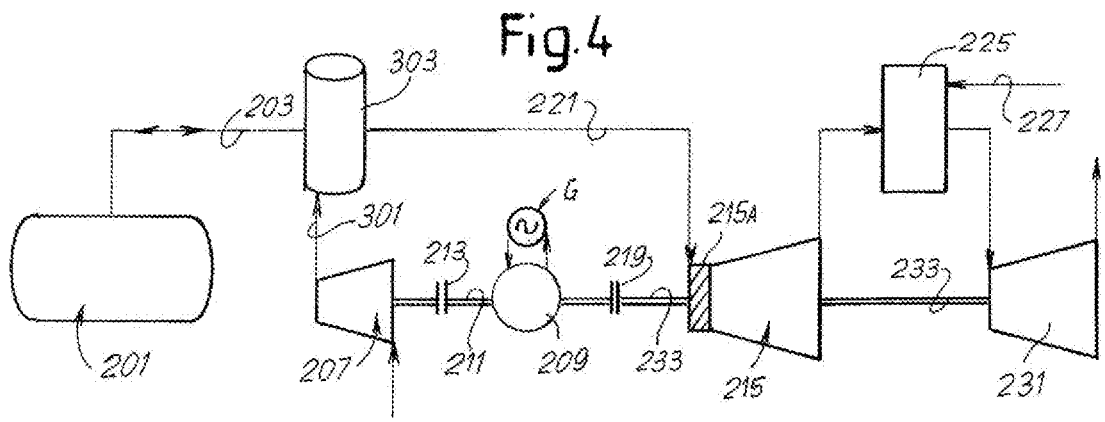

FIG. 4 shows a further CAES power plant according to the present disclosure. The same reference numbers as in FIG. 3 are used to indicate the same or equivalent parts of the power plant. The power plant of FIG. 4 differs from the power plant of FIG. 3 mainly for the presence of a thermal-energy recovery arrangement, designed to recover and store heat from the compressed air during the air-compressing phase and heat the compressed airflow before expansion during the electric-power generation phase.

More specifically, in the exemplary embodiment shown in FIG. 4, the compressor train 207 can comprise two or more compressors arranged in series. In other embodiments a single compressor can be used. Air from the environment is taken in by the compressor 207 and delivered through a line 301 to a thermal-energy storage device 303. In some exemplary embodiments the thermal-energy storage device 303 can be comprised of a heat-accumulating material such as a salt, which stores thermal energy in form of liquefaction heat, for example. The compressed air flows through the thermal-energy storage device 303 and heat is removed therefrom and stored, e.g. in the form of liquefaction heat in a mass of heat-accumulation salt. The first thermal-energy storage device 303 acts, therefore, similarly to an inter-cooler-heat exchanger, but the heat extracted from the compressed airflow is accumulated rather than discharged to the atmosphere. After cooling in the thermal-energy storage device 303, air is delivered through the compressed-air line 203 in the compressed-air storage volume or cavern 201.

With this arrangement, during the air compression phase the surplus electric power available on the electric distribution grid G, i.e. the off-peak energy is partly converted into pressure energy stored in the cavern 201 and partly into thermal energy stored in the thermal-energy storage device 303.

When additional electric power is required on the electric distribution grid G, the electric-power generation phase is started. Compressed air is delivered from the cavern 201 to the variable-nozzle expander 215 and to the combustion chamber 225. In the combustion chamber 225 fuel from the gas grid 227 or the like is mixed with the partially expanded airflow delivered from the variable-nozzle expander 215. The air/fuel mixture is ignited. Compressed, high-temperature, combustion gas is thus generated, which is then expanded in the turbine 231, producing useful mechanical power which is made available, along with the useful mechanical power generated by the variable-nozzle expander 215, on the shaft 233 and converted into electric power by the reversible electric machine 209.

The compressed air flowing in the compressed-air line 203, 221 flows through the thermal-energy storage device 303 and is heated up. Thermal energy stored in the thermal-energy storage device 303 is thus recovered and used to increase the airflow temperature before expansion in the variable-nozzle expander. A fraction of said thermal energy is therefore transformed into additional useful mechanical power available on shaft 223, to drive the reversible electric machine.

Figure 5:
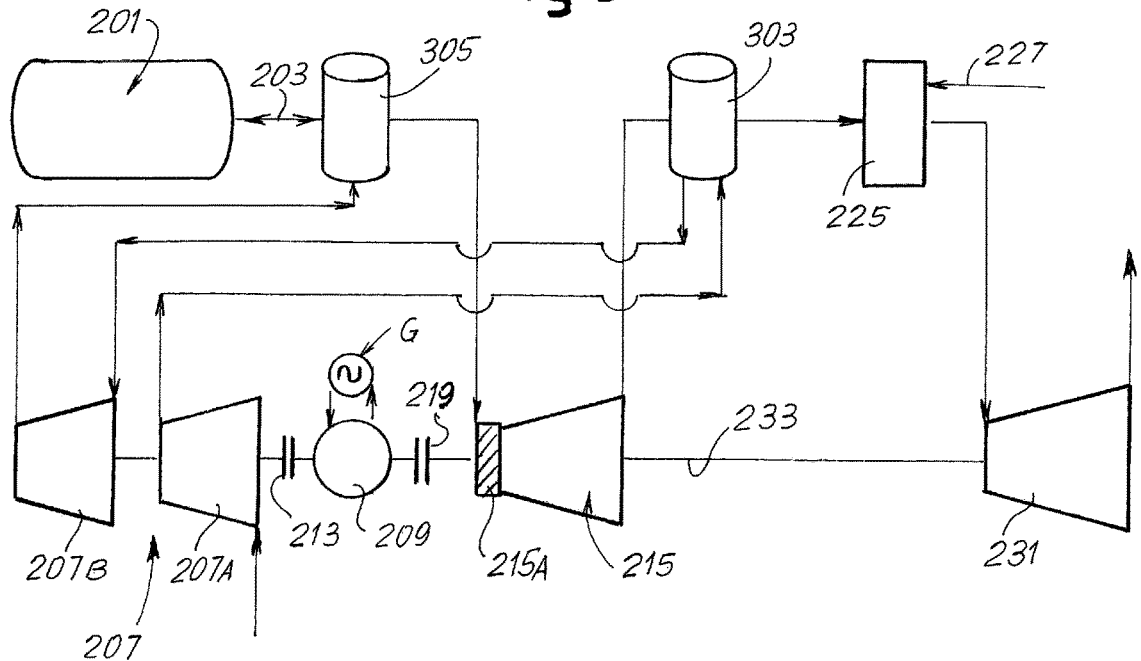

FIG. 5 illustrates a further embodiment of a CAES power plant according to the disclosure. The same reference numbers indicate the same or equivalent parts as in FIGS. 3 and 4.

The main difference between the embodiment of FIG. 5 and the embodiment of FIG. 4 is the second thermal-energy storage device 305 and the use of a compressor train comprising two compressors 207A, 207B. Heat is recovered from the compressed air exiting compressor 207A and accumulated in the thermal-energy storage device 303. Heat recovered from the second compressor 207B is accumulated in the second thermal-energy storage device 305.

In FIG. 5 the first thermal-energy storage device 303 is arranged on the connection between the output of the variable-nozzle expander 215 and the entry of the combustion chamber 225. The second thermal-energy storage device 305 is arranged on the connection line between the cavern 201 and the inlet of the variable-nozzle expander 215.

With this arrangement part of the thermal energy recovered during the air-compressing phase is used to heat the compressed airflow coming from the cavern 201 prior to the first expansion in the variable-nozzle expander 215. A second part of the thermal energy is vice versa recovered by heating the partly expanded airflow exiting the variable-nozzle expander 215 before entering the combustion chamber 225.

Figure 6:
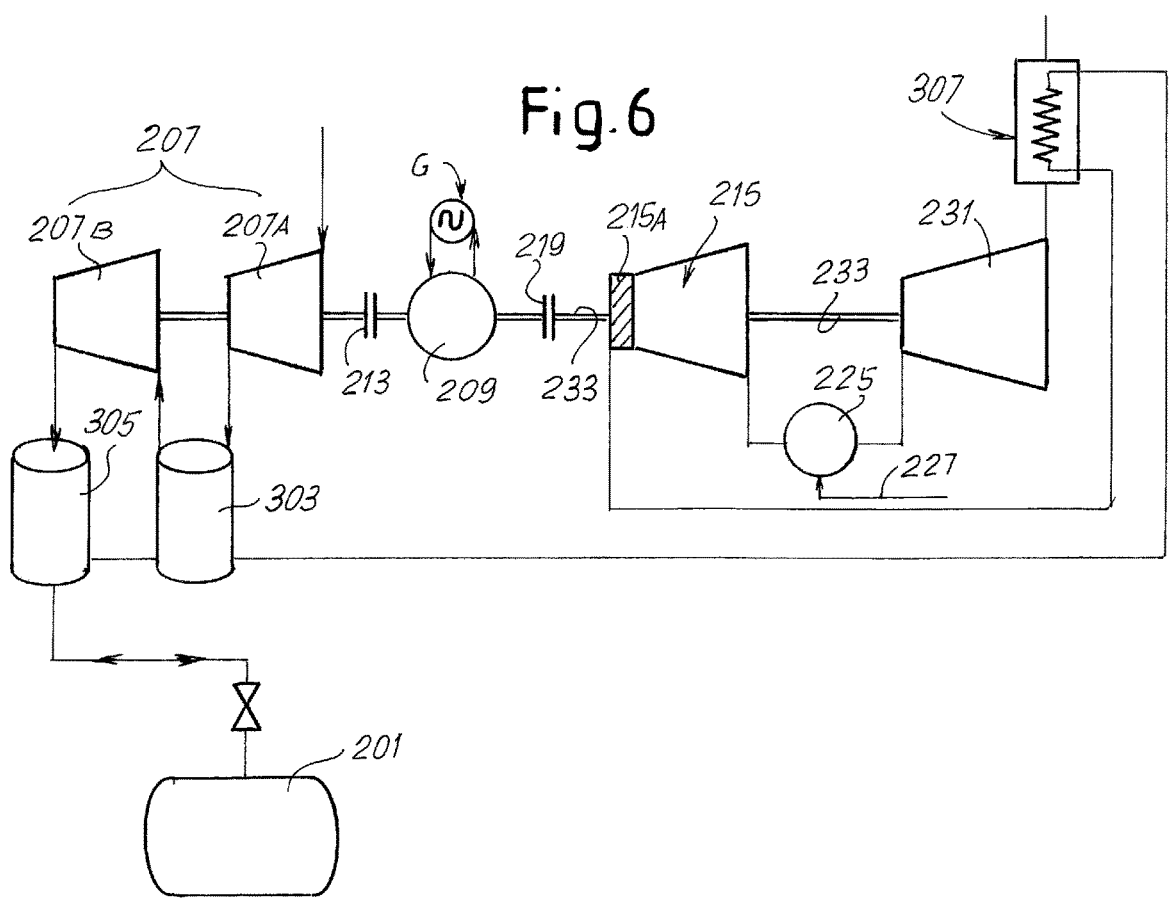

FIG. 6 shows yet a further embodiment of a CAES power plant according to the disclosure. The same reference numbers as in FIGS. 4 and 5 are used to indicate the same or equivalent parts.

The power plant of FIG. 6 differs from the power plant of FIG. 4 mainly because a further heat recovery arrangement is provided. During the electric-power generation phase, compressed airflow from the cavern 201 is heated sequentially in the thermal-energy storage device 305 and in the thermal-energy storage device 303. The heated, compressed airflow is then further heated by heat exchange against the exhausted combustion gas exiting the turbine 231 in a heat exchanger 307. The compressed and heated airflow is then delivered to the variable-nozzle expander 215.

In the above described embodiments, reversible electric machines have been used in the system, to produce mechanical power or electric power, alternatively. In other embodiments, separate electric machines, can be used, for electric power generation and mechanical power generation, respectively, suitable clutch arrangements being provided to establish the correct mechanical connections between the various components of the system.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. Different features, structures and instrumentalities of the various embodiments can be differently combined. For example, thermal-energy recovery devices can be combined also in the embodiments of FIGS. 2 and/or 3. Similarly, heat recovery from exhaust combustion gas from the turbine can be provided also in the embodiments of FIGS. 2, 3, 4 and 5.

What is claimed is:

1. A method for producing energy from a compressed-air energy-storage system, the method comprising:
   delivering compressed air from a cavern to a high-pressure inlet line including a three-way valve,
   directing, by the three-way valve, a first portion of the compressed air to a variable-nozzle expander;
   producing mechanical power by partially expanding the first portion of the compressed air from a first pressure to a second pressure in the variable-nozzle expander, the first pressure being higher than the second pressure;
   maintaining the second pressure of the partially expanded first portion of the compressed air within a range of pre-set pressure values by configuring the variable-nozzle expander to control the second pressure;
   delivering the partially expanded first portion of the compressed air at the second pressure to a combustion chamber;
   directing, by the three-way valve, a second portion of the compressed air directly to the combustion chamber via an auxiliary line;
   mixing fuel with the partially expanded first portion of the compressed air from the variable-nozzle expander and the second portion of the compressed air in the combustion chamber;
   combusting the air and fuel mixture to produce a high temperature, pressurized combustion gas;
   producing mechanical power by expanding the high temperature, pressurized combustion gas in a turbine;
   using the variable-nozzle expander and the turbine to drive a first electric machine and a second electric machines, respectively, to produce electric power;
   providing a first air compressor configured to be driven by the first electric machine, wherein the first air compressor is connected to the cavern by a first compressed-air line path; and
   providing a second air compressor configured to be driven by the second electric machine, wherein the second air compressor is connected to the cavern by a second compressed-air line path, different from the first compressed-air line path.

2. The method according to claim 1, further comprising maintaining the second pressure of the partially expanded first portion of the compressed air at a substantially constant value using the variable-nozzle expander.

3. The method according to claim 1, further comprising:
   providing compressed air to the cavity using at least one of the first and second air compressors during an air-compressing phase; phase before and/or after delivering the compressed air from the cavern to the high-pressure inlet line.

4. The method according to claim 1, wherein the first and second electric machines are reversible electric machines.

5. The method according to claim 4, comprising:
   selectively using the first and second reversible electric machines to:
     convert the mechanical power into electric power, or
     convert electric power from an electric distribution grid into mechanical power for driving the first and second air compressors.

6. A compressed-air energy-storage system comprising:
   a cavern;
   a high-pressure inlet line;
   at least one variable-nozzle expander configured to:
     partially expand an airflow from a first pressure to a second pressure lower than the first pressure, and
     maintain the second pressure within a pressure range around a pre-set constant pressure value, wherein the high-pressure inlet line connects the cavern to the at least one variable-nozzle expander;
   the compressed-air energy storage system further comprising:
     at least one combustion chamber configured to receive a fuel and the partially expanded airflow from the at least one variable-nozzle expander and combust the partially expanded airflow and fuel to produce a combustion gas;

at least one turbine configured to receive the combustion gas from the at least one combustion chamber and expand the combustion gas producing mechanical power;

a first electric machine configured and arranged to transform mechanical power produced by the at least one variable-nozzle expander into electric power; and a second electric machine configured and arranged to transform mechanical power produced by the at least one turbine into electric power;

a first air compressor configured to be driven by the first electric machine, wherein the first air compressor is connected to the cavern by a first compressed-air path; and a second air compressor configured to be driven by the second electric machine, wherein the second air compressor is connected to the cavern by a second compressed-air line path, different from the first compressed-air line path;

a three-way valve interposed between the cavern and the at least one variable-nozzle expander, wherein a portion of the high-pressure inlet line extends from the three-way valve to the at least one variable-nozzle expander; and an auxiliary line extending directly from the three-way valve to the combustion chamber.

7. The compressed-air energy-storage system according to claim 6, wherein the at least one variable-nozzle expander is configured to maintain the second pressure at a substantially constant value.

8. The compressed-air energy-storage system according to claim 6,
wherein the first electric machine and the second electric machine are configured and arranged to transform electric power from an electric distribution grid into mechanical power.

9. The compressed-air energy-storage system according to claim 8, wherein the first electric machine is configured and arranged to drive the first air compressor when transforming electric power from the electric distribution grid into mechanical power and the second electric machine is configured and arranged to drive the second air compressor when transforming electric power from the electric distribution grid into mechanical power.

10. The compressed-air energy-storage system according to claim 6, wherein the at least one variable-nozzle expander and the at least one turbine have two independent shafts.

11. The compressed-air energy-storage system according to claim 6, wherein the first electric machine and the second electric machine are reversible electric machines and are further arranged and configured to selectively transform mechanical power from the at least one variable-nozzle expander and the at least one turbine, respectively, into electric power, or produce mechanical power when powered by an electrical distribution grid.

12. The compressed-air energy-storage system according to claim 6, wherein the first air compressor is selectively connectable to and disconnectable from the first electric machine and the second air compressor is selectively connectable to and disconnectable from the second electric machine.

13. The compressed-air energy-storage system according to claim 6, wherein the second pressure fluctuates less than 20% about the pre-set constant pressure value.

* * * * *